(12) United States Patent
Zhang et al.

(10) Patent No.: US 8,186,152 B2
(45) Date of Patent: May 29, 2012

(54) APPARATUS AND METHOD FOR COOLING TURBOMACHINE EXHAUST GAS

(75) Inventors: Hua Zhang, Greer, SC (US); David Wesley Ball, Jr., Easley, SC (US); Thomas Francis Taylor, Greenville, SC (US)

(73) Assignee: General Electric Company, Schenectady, NY (US)

( * ) Notice: Subject to any disclaimer, the term of this patent is extended or adjusted under 35 U.S.C. 154(b) by 684 days.

(21) Appl. No.: 12/177,919

(22) Filed: Jul. 23, 2008

(65) Prior Publication Data

US 2010/0018180 A1    Jan. 28, 2010

(51) Int. Cl.
*F01N 3/10*    (2006.01)
(52) U.S. Cl. .......................................... 60/299; 60/777
(58) Field of Classification Search .................. 60/772, 60/39.5, 299, 777
See application file for complete search history.

(56) References Cited

U.S. PATENT DOCUMENTS

| | | | |
|---|---|---|---|
| 3,517,730 A | 6/1970 | Wyatt | |
| 3,722,797 A | 3/1973 | Hammill | |
| 3,852,805 A | 12/1974 | Brzozowski | |
| 4,033,406 A | 7/1977 | Basiulis | |
| 4,036,290 A | 7/1977 | Kelly | |
| 4,149,588 A | 4/1979 | Waters | |
| 4,226,282 A | 10/1980 | Kunsagi et al. | |
| 4,234,782 A | 11/1980 | Barabas et al. | |
| 4,372,110 A * | 2/1983 | Fletcher et al. | 60/262 |
| 4,932,204 A | 6/1990 | Pavel et al. | |
| 5,311,930 A | 5/1994 | Bruenn | |
| 5,632,143 A | 5/1997 | Fisher et al. | |
| 5,918,555 A | 7/1999 | Winegar | |
| 6,041,588 A | 3/2000 | Bruckner et al. | |
| 6,065,280 A | 5/2000 | Ranasinghe et al. | |
| 6,132,823 A | 10/2000 | Qu | |
| 6,241,009 B1 | 6/2001 | Rush | |
| 6,397,575 B2 | 6/2002 | Tomlinson et al. | |
| 6,782,703 B2 | 8/2004 | Dovali-Solis | |
| 6,866,092 B1 | 3/2005 | Molivadas | |

(Continued)

FOREIGN PATENT DOCUMENTS

DE    294483    4/1915

(Continued)

OTHER PUBLICATIONS

EP Search Report for Application No. EP 09 16 5813; Search Report dated Nov. 18, 2009.

(Continued)

*Primary Examiner* — Ehud Gartenberg
*Assistant Examiner* — Vikansha Dwivedi
(74) *Attorney, Agent, or Firm* — Cantor Colburn LLP

(57) ABSTRACT

Disclosed is a turbomachine including at least one exhaust pathway along which exhaust is directed and released to ambient and at least one exhaust processor capable of removing regulated substances from the exhaust. One or more ambient air inlets are located at the at least one exhaust pathway upstream of the at least one exhaust processor. The at least one exhaust pathway is configured such that ambient air is capable of being urged into the at least one exhaust pathway through the one or more ambient air inlets by an acceleration of the exhaust along the at least one exhaust pathway. The ambient air urged into the at least one exhaust pathway reduces a temperature of the exhaust to increase effectiveness of the at least one exhaust processor. Further disclosed is a method for releasing turbomachine exhaust to ambient.

19 Claims, 3 Drawing Sheets

U.S. PATENT DOCUMENTS

| | | |
|---|---|---|
| 6,874,322 B2 | 4/2005 | Schwarzott |
| 6,962,051 B2 | 11/2005 | Radcliff |
| 7,069,716 B1 | 7/2006 | Childers |
| 7,131,294 B2 | 11/2006 | Manole |
| 7,382,047 B2 | 6/2008 | Chen et al. |
| 7,621,720 B2 | 11/2009 | Nies |
| 7,730,727 B2 | 6/2010 | Yuan et al. |
| 2003/0182944 A1 | 10/2003 | Hoffman et al. |
| 2004/0045294 A1 | 3/2004 | Kobayashi et al. |
| 2006/0083626 A1 | 4/2006 | Manole |
| 2007/0017207 A1 | 1/2007 | Smith et al. |
| 2007/0068167 A1* | 3/2007 | Patel et al. ............... 60/772 |
| 2007/0074515 A1 | 4/2007 | Yoshino |
| 2007/0234704 A1 | 10/2007 | Moniz et al. |
| 2008/0115923 A1 | 5/2008 | Yamanaka et al. |
| 2008/0290567 A1 | 11/2008 | Thillen et al. |
| 2008/0304954 A1 | 12/2008 | Hoffman et al. |
| 2010/0024382 A1 | 2/2010 | Zhang et al. |
| 2010/0089062 A1 | 4/2010 | Cao |

FOREIGN PATENT DOCUMENTS

| | | |
|---|---|---|
| EP | 0794401 A3 | 9/1997 |
| GB | 2099126 A | 12/1982 |

OTHER PUBLICATIONS

Zhang, Hua, et al. "System and Method for Managing Turbine Exhaust Gas Temperature," U.S. Appl. No. 12/211,456, filed Sep. 16, 2008, Specification having 12 pages, Figures having 4 sheets.

EP Search Report for EP Application No. EP09173330. Dated Nov. 25, 2010.

* cited by examiner

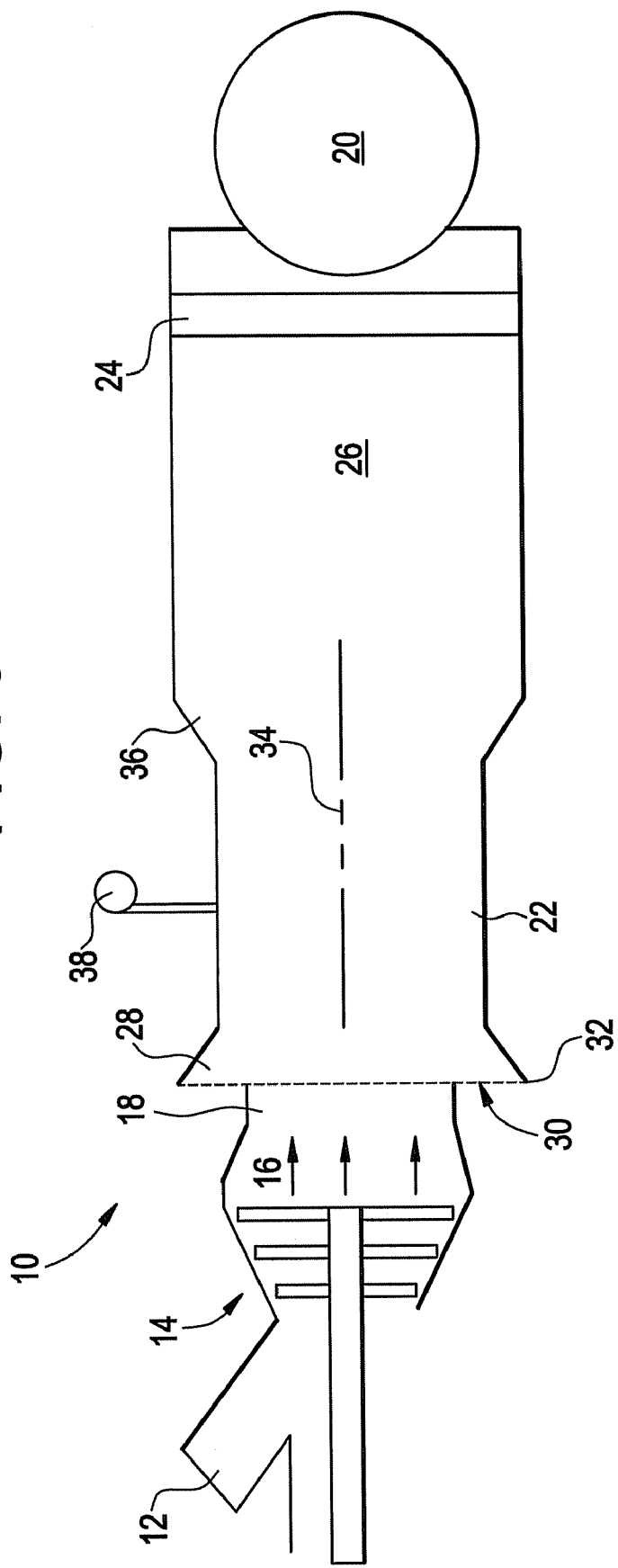

APPARATUS AND METHOD FOR COOLING TURBOMACHINE EXHAUST GAS

BACKGROUND

The subject invention relates to turbomachinery. More particularly the subject invention relates to cooling of exhaust gas of turbomachinery.

Exhaust gas from turbomachinery, for example a gas turbine power generation plant, often must meet stringent regulatory requirements for composition of the exhaust gas released into the atmosphere. One of the components typically found in exhaust gas and subject to regulation is $NO_x$. To remove the $NO_x$ from the exhaust stream, technology such as Selective Catalytic Reduction (SCR) is often utilized. In an SCR process, ammonia ($NH_3$) or the like reacts with the $NO_x$ and produces nitrogen ($N_2$) and water ($H_2O$). Effectiveness of the SCR process depends on the temperature of the exhaust gas which is processed. Exhaust gas from the turbomachinery is often about 1100 degrees F., and must be cooled prior to SCR to increase the effectiveness of SCR to meet requirements. This cooling is typically achieved by diluting the exhaust gas with cooler ambient air urged into the exhaust gas stream by large fan systems. These fan systems must be capable of high flow rates and high pressures and increase complexity and cost to operation of the turbomachinery.

BRIEF DESCRIPTION OF THE INVENTION

According to one aspect of the invention, a turbomachine includes at least one exhaust pathway along which exhaust is directed and released to an ambient environment and at least one exhaust processor capable of removing substances from the exhaust. One or more ambient air inlets are located at the exhaust pathway upstream of the exhaust processor. The at least one exhaust pathway is configured to reduce a pressure of exhaust therein to draw ambient air into the at least one exhaust pathway via the one or more ambient air inlets. The ambient air reduces a temperature of the exhaust to increase effectiveness of the at least one exhaust processor.

According to another aspect of the invention, a method for releasing turbomachine exhaust to an ambient environment includes accelerating exhaust along at least one exhaust pathway and lowering a pressure of the exhaust in the at least one exhaust pathway. The method further includes drawing ambient air into the at least one exhaust pathway through one or more ambient air inlets via the lowering of the pressure of the exhaust, thereby reducing a temperature of the exhaust, and dispensing the exhaust to an ambient environment.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 is a schematic view of another embodiment of an exhaust apparatus for a turbomachine.

The detailed description explains embodiments of the invention, together with advantages and features, by way of example with reference to the drawings.

DETAILED DESCRIPTION OF THE INVENTION

Figure 1:
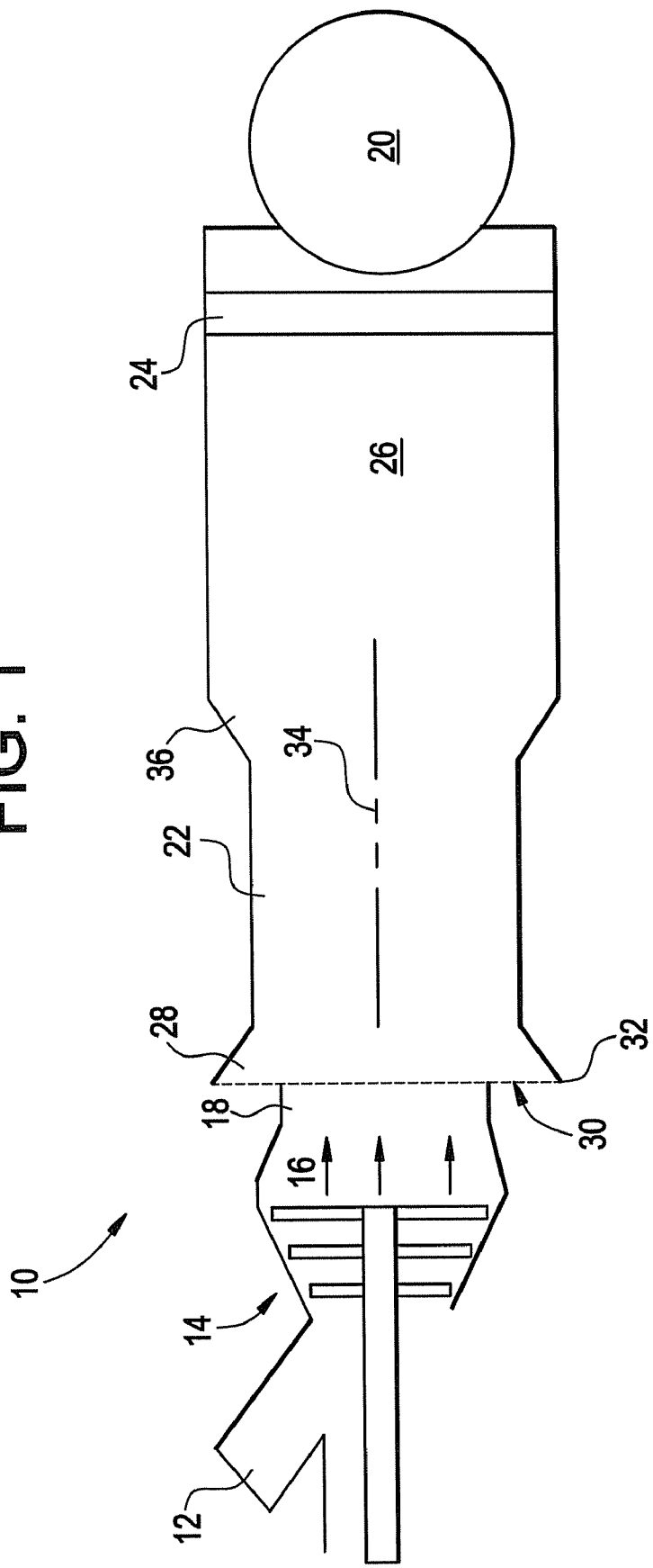
FIG. 1 is a schematic view of an embodiment of an exhaust apparatus for a turbomachine.

Shown in FIG. 1 is a schematic illustration of an embodiment of a turbomachine, for example, a gas turbine 10. The gas turbine 10 includes one or more combustors 12 in which fuel and compressed air are mixed and ignited. The hot gas product of the combustion flows to a turbine 14 which extracts work from the hot gas. After flowing through the turbine 14, the hot gas or exhaust 16, flows through an exhaust port 18 toward a stack 20 via a mixing duct 22 for release into atmosphere.

Figure 2:
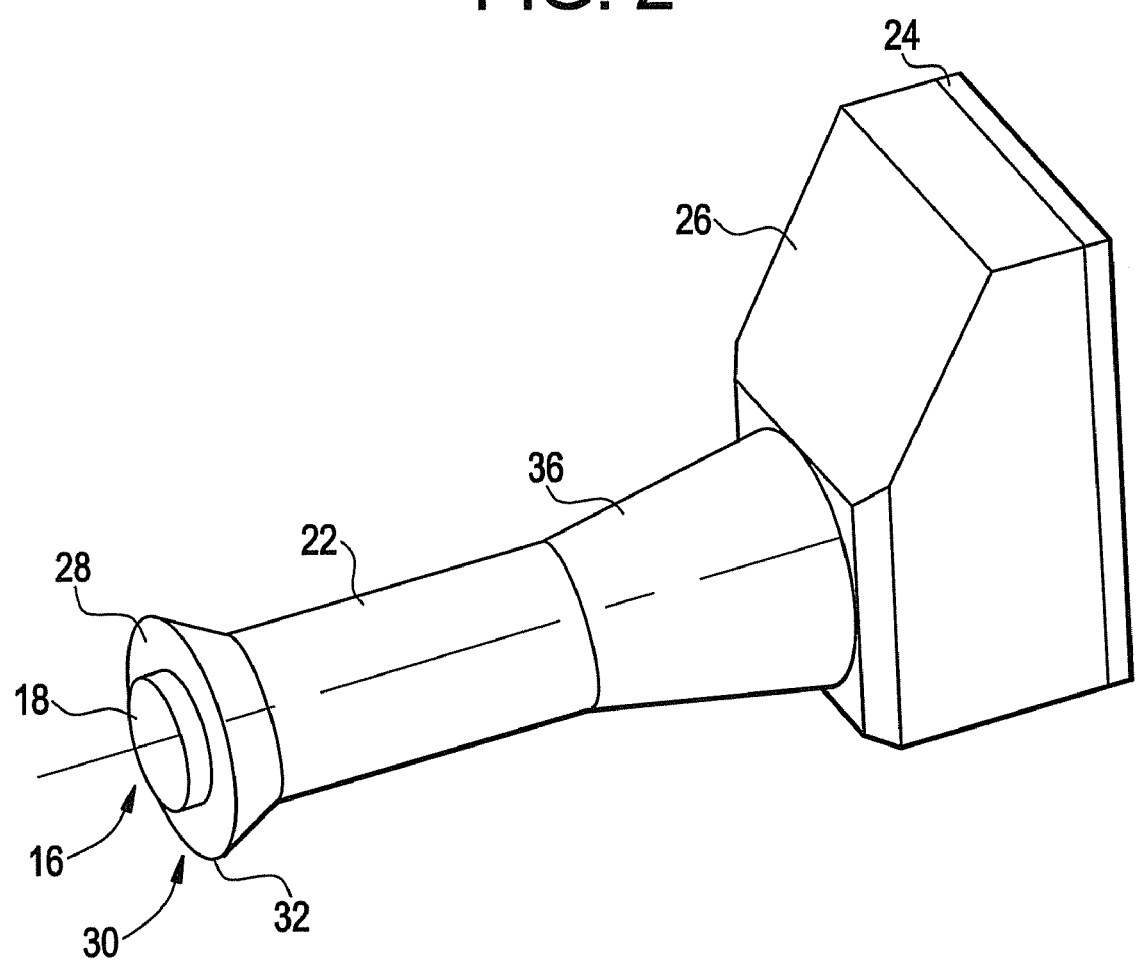
FIG. 2 is a partial perspective view of the exhaust apparatus of FIG. 1.

To reduce an amount of undesired substances, for example, $NO_x$ released into the atmosphere from the stack 20, the exhaust 16 is urged through an exhaust processor, in some embodiments a Selective Catalytic Reduction (SCR) system 24 prior to release into the atmosphere. As shown in FIG. 1, the SCR system 24 is, in some embodiments, disposed between the mixing duct 22 and the stack 20 at, for example, a transition duct 26. It is to be appreciated, however, that the SCR system 24 may be disposed in other locations, for example, in the mixing duct 22 or in the stack 20. Further, the embodiments are not limited to the use of one SCR system 24, but multiple SCR systems 24 may be utilized. The SCR system 24 often includes a quantity of a catalyst and an ammonia ($NH_3$) injection grid. In the catalyst, the ammonia ($NH_3$) reacts with $NO_x$ in the exhaust 16 and produces nitrogen ($N_2$) and water ($H_2O$) thereby removing regulated $NO_x$ from the exhaust 16 prior to releasing the exhaust 16 into the atmosphere. The utilization of an SCR system to remove $NO_x$ from the exhaust is merely exemplary. It is to be appreciated that other exhaust processors may be utilized to remove other undesired substances, for example, $SO_x$, Hg or particulates from the exhaust The mixing duct 22 of the embodiment of FIG. 1 has a cross-sectional area larger than the cross sectional area of the exhaust port 18 and directs the exhaust 16 toward the SCR system 24. One or more secondary inlets 28 are provided in the mixing duct 22 which allow ambient air 30 to enter the mixing duct 22 to cool the exhaust 16 prior to the exhaust 16 reaching the SCR system 24. As best shown in FIG. 2, an embodiment of a secondary inlet 28 is disposed at a substantially upstream end 32 of the mixing duct 22 and is conically-shaped extending radially away from a mixing duct axis 34 and longitudinally toward the exhaust port 18. It is to be appreciated that the configuration of FIG. 2 is merely exemplary, and other configurations and/or locations of the one or more secondary inlets 28 are contemplated within the present scope. For example, the one or more secondary inlets 28 may be disposed at other locations along the mixing duct axis 34 and/or may be configured as a quantity of secondary inlets 28 located around a perimeter of the mixing duct 22.

The mixing duct 22 is configured to urge the ambient 30 into the mixing duct 22 via the one or more secondary inlets 28. Exhaust flowing from the exhaust port 18 to the mixing duct 22 of FIG. 1 expands due to the larger cross sectional area of the mixing duct 22, thus creating a region of relatively low pressure in the mixing duct 22. The low pressure creates a suction effect, drawing ambient air 30 into the mixing duct 22 through the one or more secondary inlets 28. In some embodiments, the mixing duct 22 is, connected to a diffuser 36 which has a divergent cross-section extending downstream toward the transition duct 26 along the mixing duct axis 34. This configuration creates further low pressure in the mixing duct 22 which increases the suction effect thus drawing more ambient air 30 into the mixing tube 22 via the one or more secondary inlets 28. In the mixing duct 22, as the exhaust 16 and the ambient air 30 proceed along the mixing duct axis 32, the ambient air 30 dilutes and mixes with the exhaust 16. The resultant mixture of the exhaust 16 and the ambient air 30 has a lower temperature that the exhaust 16 exiting the turbine 14.

In some embodiments, a temperature of the exhaust 16 entering the mixing duct 22 from the gas turbine 10 is approximately 1100-1200 degrees F. The mixing duct 22 and the one or more secondary inlets 28 are configured to achieve a temperature of the exhaust 16 and ambient air 30 mixture of 800-900 degrees F. before the exhaust 16 enters the SCR system 24. Reducing the temperature of the exhaust 16 to that range increases the effectiveness of the SCR system 24 in removing $NO_x$ from the exhaust 16 before releasing the exhaust 16 through the stack 20. Further, cooling the exhaust 16 via the ambient air 30 urged into the mixing duct 22 via the one or more secondary inlets 28 may be accomplished without utilization of prior art fans thereby decreasing complexity of the gas turbine 10.

As shown in FIG. 3, in some embodiments where greater mixing and/or cooling is desired, one or more blowers 38 are utilized to inject additional ambient air 30 into the mixing duct 22 downstream of the one or more secondary inlets 28. The ambient air 30 provided by the one or more blowers 38 further cools the exhaust 16 to ensure that the exhaust 16 reaching the SCR system 24 is at a temperature that increases the effectiveness of the SCR system 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine comprising:
   at least one exhaust pathway along which exhaust is directed and released to an ambient environment;
   at least one exhaust processor capable of removing substances from the exhaust;
   one or more ambient air inlets disposed at the at least one exhaust pathway upstream of the at least one exhaust processor, the at least one exhaust pathway reducing a pressure of exhaust therein to draw ambient air into the at least one exhaust pathway via the one or more ambient air inlets without use of a fan, the ambient air reducing a temperature of the exhaust to increase effectiveness of the at least one exhaust processor.

2. The turbomachine of claim 1 wherein the at least one exhaust processor is at least one selective catalytic reactor.

3. The turbomachine of claim 2 wherein the at least one selective catalytic reactor removes $NO_x$ from the exhaust.

4. The turbomachine of claim 1 wherein the at least one exhaust pathway comprises a mixing duct disposed downstream of an exhaust port, the mixing duct having a larger cross-sectional area than the exhaust port, thus reducing the pressure of the exhaust therein.

5. The turbomachine of claim 1 wherein one or more ambient air inlets are conically-shaped.

6. The turbomachine of claim 1 wherein the one or more ambient air inlets is one ambient air inlet.

7. The turbomachine of claim 6 wherein the one ambient air inlet is coaxial with one exhaust pathway of the at least one exhaust pathway.

8. The turbomachine of claim 1 wherein the ambient air urged into the at least one exhaust pathway is capable of reducing the temperature of the exhaust to about 800-900 degrees F.

9. The turbomachine of claim 1 including at least one blower capable of injecting additional ambient air into the at least one exhaust pathway downstream of the one or more ambient air inlets.

10. A method for releasing turbomachine exhaust to an ambient environment comprising:
    accelerating exhaust along at least one exhaust pathway;
    lowering a pressure of the exhaust in the at least one exhaust pathway;
    drawing ambient air into the at least one exhaust pathway through one or more ambient air inlets without use of a fan via the lowering of the pressure of the exhaust, thereby reducing a temperature of the exhaust; and
    dispensing the exhaust to an ambient environment.

11. The method of claim 10 including:
    flowing the exhaust through at least one exhaust processor; and
    removing substances from the exhaust via the at least one exhaust processor.

12. The method of claim 11 wherein removing the substances from the exhaust is accomplished via at least one selective catalytic reactor.

13. The method of claim 11 wherein the substances include $NO_x$.

14. The method of claim 11 wherein the temperature of the exhaust is reduced to about 800-900 degrees F. thereby increasing an effectiveness of the at least one exhaust processor.

15. The method of claim 10 wherein the reducing a temperature of the exhaust is accomplished by mixing of the ambient air with the exhaust in the at least one exhaust pathway.

16. The method of claim 10 wherein one or more ambient air inlets are conically-shaped.

17. The method of claim 10 wherein the one or more ambient air inlets is one ambient air inlet.

18. The method of claim 17 wherein the one ambient air inlet is coaxial with one exhaust pathway of the at least one exhaust pathway.

19. The method of claim 10 including injecting additional ambient air into the at least one exhaust pathway downstream of the one or more ambient air inlets via at least one blower.

* * * * *